United States Patent
Zhang et al.

(10) Patent No.: US 9,893,596 B2
(45) Date of Patent: Feb. 13, 2018

(54) MAGNETIC ALIGNMENT SYSTEM AND ALIGNMENT METHOD THEREFOR

(71) Applicant: SHANGHAI MICRO ELECTRONICS EQUIPMENT CO., LTD., Shanghai (CN)

(72) Inventors: Lin Zhang, Shanghai (CN); Xiaowen Zhang, Shanghai (CN); Lin Guo, Shanghai (CN); Jun Chen, Shanghai (CN); Zhigang Zhang, Shanghai (CN)

(73) Assignee: Shanghai Micro Electronics Equipment (Group) Co., Ltd., Shanghai (CN)

( * ) Notice: Subject to any disclaimer, the term of this patent is extended or adjusted under 35 U.S.C. 154(b) by 216 days.

(21) Appl. No.: 14/758,720

(22) PCT Filed: Jan. 22, 2014

(86) PCT No.: PCT/CN2014/071089
§ 371 (c)(1),
(2) Date: Jun. 30, 2015

(87) PCT Pub. No.: WO2014/114231
PCT Pub. Date: Jul. 31, 2014

(65) Prior Publication Data
US 2015/0340931 A1   Nov. 26, 2015

(30) Foreign Application Priority Data

Jan. 25, 2013   (CN) .......................... 2013 1 0030302

(51) Int. Cl.
*H02K 11/00*   (2016.01)
*H02K 1/22*   (2006.01)
(Continued)

(52) U.S. Cl.
CPC ............. *H02K 11/001* (2013.01); *H02K 1/22* (2013.01); *H02K 11/20* (2016.01); *H02K 15/02* (2013.01);
(Continued)

(58) Field of Classification Search
CPC .... H02K 41/031; H02K 11/001; H02K 11/20; H02K 15/02; H02K 1/22; H02K 2201/18; Y10T 29/49014
See application file for complete search history.

(56) References Cited

U.S. PATENT DOCUMENTS 7,205,741 B2    4/2007   Simons et al.
2001/0003326 A1*  6/2001   Okada ..................... G01L 5/165
                                                              200/516

(Continued)

FOREIGN PATENT DOCUMENTS

CN         102607388 A      7/2012
CN         102730122 A     10/2012

*Primary Examiner* — Naishadh Desai
(74) *Attorney, Agent, or Firm* — Muncy, Geissler, Olds & Lowe, P.C.

(57) ABSTRACT

A magnetic alignment system is disclosed, including a magnet array (10), a motor rotor (20), a fixed tooling (30) and a force sensor (40). The motor rotor (20) is disposed over the magnet array (10) and is connected via the force sensor (40) to the fixed tooling (30) that is positionally fixed relative to the magnet array (10). By varying an angle of a three-phase current supplied to a specific one of three-phase coil assemblies in the motor rotor (20) within an angular range for magnetic alignment and measuring a force generated by the specific one of three-phase coil assemblies using the force sensor (40), an angle of magnetic alignment for the specific one of three-phase coil assemblies is determinable based on the angle of three-phase current that causes the specific one of three-phase coil assemblies to generate a maximum force.

9 Claims, 5 Drawing Sheets

(51) Int. Cl.
*H02K 15/02* (2006.01)
*H02K 41/03* (2006.01)
*H02K 11/20* (2016.01)

(52) U.S. Cl.
CPC ....... *H02K 41/031* (2013.01); *H02K 2201/18* (2013.01); *Y10T 29/49014* (2015.01)

(56) References Cited

U.S. PATENT DOCUMENTS

2005/0034543 A1* 2/2005 Xi .......................... B82Y 35/00
                                                    73/862.634
2005/0285550 A1* 12/2005 Simons ............... G08F 7/70725
                                                    318/135

* cited by examiner

MAGNETIC ALIGNMENT SYSTEM AND ALIGNMENT METHOD THEREFOR

TECHNICAL FIELD

The present invention relates to a magnetic alignment system and method for a moving-coil magnetic-levitation planar motor.

BACKGROUND

Control principle of a moving-coil magnetic-levitation planar motor is basically similar to the control principle of a common linear motor, i.e., adjusting an angle of a current flowing through the motor's three-phase coils based on the position of the coils in a magnetic field such that the motor exerts a constant force in a desired direction. Such control is vector control based on ID and IQ decoupling. Therefore, whether an accurate initial angle of magnetic alignment is obtained not only determines whether generation of maximum horizontal and vertical forces can be ensured for the moving-coil maglev planar motor but also affects the motor's decoupling between the horizontal and vertical directions. If the angle of magnetic alignment is inaccurate or the decoupling between the horizontal and vertical directions is not perfect, crosstalk between the horizontal and vertical directions will be introduced in the control, which will decrease servo performance of the motor.

Figure 1:
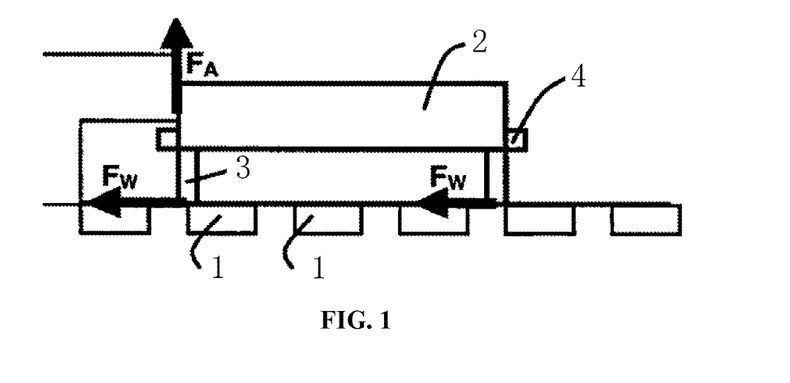
FIG. 1 is a schematic illustration of a conventional magnetic alignment system for a moving-coil magnetic-levitation planar motor.

U.S. Pat. No. 7,205,741B2 discloses an existing system for determining an initial angle of magnetic alignment. As shown in FIG. 1, this solution includes: positioning a sensitive component 3 formed of a layer of a compressible material between coils 1 and a magnet 2 of a motor; using a capacitive or inductive distance sensor 4 to determine a compression of the sensitive component 3 occurring upon the motor exerting a vertical force; searching for the initial angle of magnetic alignment of the motor within a range for magnetic alignment by varying an angle of a current supplied to the three-phase coils and determining a corresponding deformation of the sensitive component 3.

The accuracy of the above-mentioned system for determining angle of magnetic alignment depends both on the deformation of the sensitive component 3 occurring upon the motor generating the vertical force and on the resolution of the distance sensor 4. This requires a good linearity between the generated vertical force and the deformation of the sensitive component 3. However, when the vertical force is too large or too small, the linearity will become insufficient to ensure a satisfying accuracy of the obtained magnetic alignment angle.

SUMMARY OF THE INVENTION

The present invention provides a magnetic alignment system and method for a moving-coil maglev planar motor for the purpose of improving magnetic alignment accuracy.

In accordance with the above purpose, a magnetic alignment system is provided, including: a magnet array, configured to produce a magnetic field; a motor rotor, disposed over the magnet array, wherein: the motor rotor includes four coil assemblies arranged in a matrix, and among each two adjacent ones of the four coil assemblies, one is oriented along a first direction and the other is oriented along a second direction perpendicular to the first direction; a fixed tooling fixed in position with respect to the magnet array and not in contact either with the rotor or with the magnet array; and a force sensor unit connected between the motor rotor and the fixed tooling and the force sensor unit is configured to, in the event of one of the four coil assemblies being supplied with a three-phase current, measure a force generated by the one of the four coil assemblies under an effect of the magnetic field.

Preferably, each of the four coil assemblies includes a plurality of three-phase coils that are arranged in parallel.

Preferably, the magnet array includes a plurality of magnets arranged along third and fourth directions in a matrix; the third and fourth directions are perpendicular to each other; the third direction forms an angle of 45 degrees with the first direction; the fourth direction forms an angle of 45 degrees with the second direction.

Preferably, in each of the four coil assemblies, each two adjacent ones of the three-phase coils are spaced by a distance of $4\tau/3$, where $\tau$ represents a pole pitch of two adjacent ones of the magnets in the magnet array.

Preferably, the force sensor unit includes a more than three-dimensional force sensor or three one-dimensional force sensors.

The present invention further provides a magnetic alignment method for use in the magnetic alignment system as defined above. The method includes:

mounting the fixed tooling and the force sensor unit, and performing an initial magnetic alignment process on each of the four coil assemblies, the initial magnetic alignment process including:

varying an angle of a three-phase current supplied to one of the four coil assemblies within an angular period for magnetic alignment and measuring a horizontal or vertical force generated by the one of the four coil assemblies using the force sensor unit; and determining an angle of magnetic alignment for the one of the four coil assemblies based on the angle of the three-phase current that causes the one of the four coil assemblies to generate a maximum horizontal or vertical force.

Preferably, the method further includes:

removing the fixed tooling and the force sensor unit and servo-correcting the angle of magnetic alignment on each of the four coil assemblies, including:

removing one of the four coil assemblies from an initial closed-loop control, causing the other three of the four coil assemblies to form a new closed-loop control under a control of a controller, and recording an output of the controller at this time as an initial offset value;

supplying a three-phase current to the one of the four coil assemblies, varying an angle of the three-phase current, and recording an output of the controller at this time as an actual output; and adjusting the angle of the three-phase current supplied to the one of the four coil assemblies to a value resulting in the actual output closest to the initial offset value.

Preferably, the angle of the three-phase current is adjusted by varying the angle within a range from an initial angle of magnetic alignment plus $-1/N$ of an angular period for magnetic alignment to the initial angle of magnetic alignment plus $1/N$ of the angular period for magnetic alignment, where N is a natural number.

The present invention has the following advantages over the conventional solution.

1) It utilizes the force sensor which has a more reliable linear operating range, compared with the compressible material used in the conventional solution, thereby reducing the influence of non-linear factors on magnetic alignment.

2) In contrast to the conventional compressible material that can only measure a vertical force of the motor, the force sensor used in the present invention is not only capable of measuring the vertical force of the motor, but also can measure its horizontal force.

3) Fixation of the rotor on the fixture by the force sensor can prevent positional deviations of the motor occurring when it generates a horizontal force exceeding a static friction force between the rotor and the surface of the magnet array.

4) Servo-correction of the angles of magnetic alignment can improve magnetic alignment accuracy without needing additional sensors, thus avoiding the influence of sensor resolution over magnetic alignment accuracy.

DETAILED DESCRIPTION

The above purposes, features and advantages of the present invention will become more apparent from the following description which is to be read in connection with the accompanying drawings. Note that the accompanying drawings are provided in a very simplified form not necessarily presented to scale, with the only purpose for convenience and clarity in explaining several specific embodiments of the invention.

Figure 2:
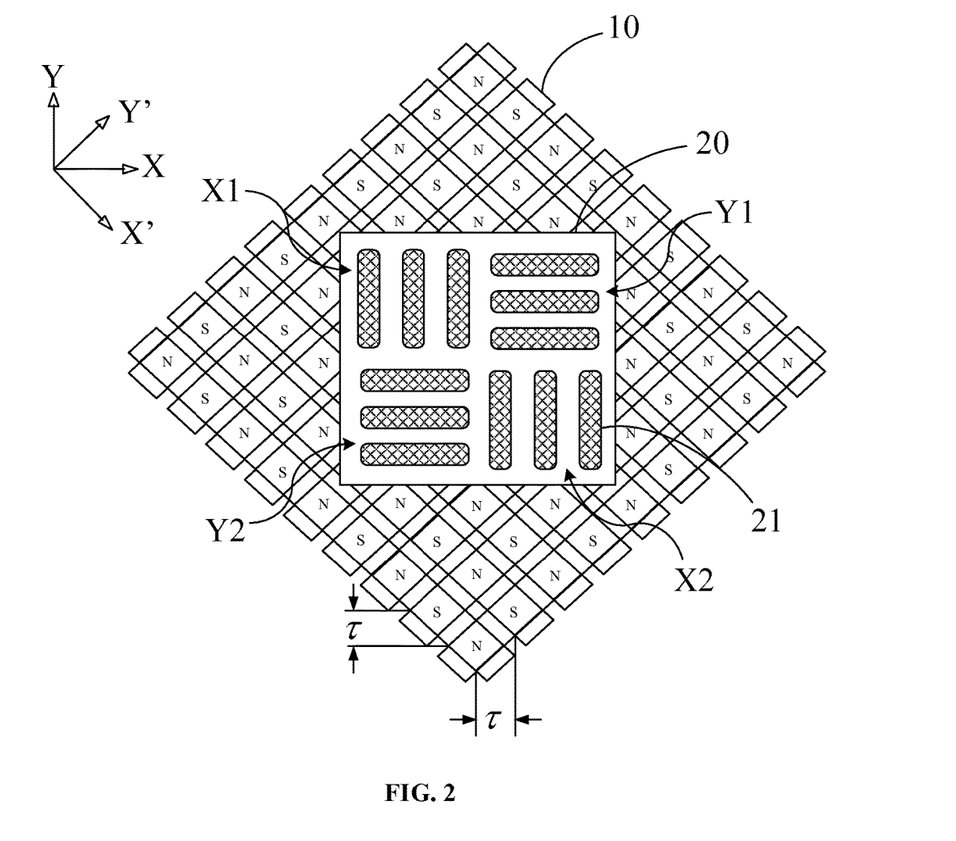
FIG. 2 is a schematic illustration of a top view of a magnetic alignment system for a moving-coil magnetic-levitation planar motor in accordance with a specific embodiment of the present invention.
Figure 3:
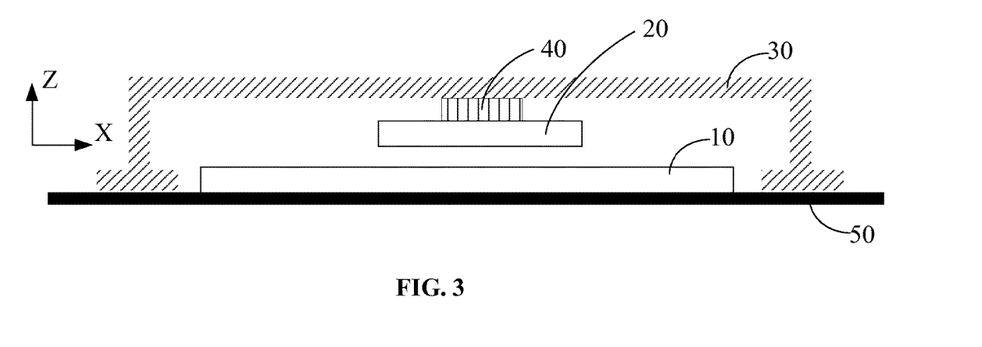
FIG. 3 depicts a lateral view of a magnetic alignment system for a moving-coil magnetic-levitation planar motor in accordance with a specific embodiment of the present invention.
Figure 4:
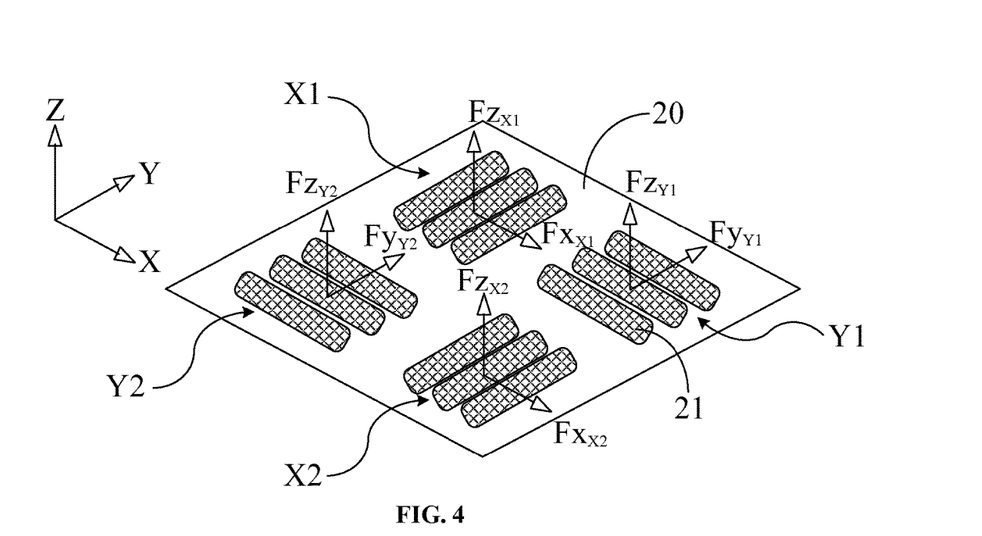
FIG. 4 schematically shows forces generated by a moving-coil magnetic-levitation planar motor in accordance with a specific embodiment of the present invention.

Referring to FIGS. 2 to 4, a magnetic alignment system for a moving-coil magnetic-levitation planar motor according to the present invention includes a magnet array 10, a motor rotor 20, a fixed tooling 30 and a force sensor 40. Specifically, the magnet array 10 is a two-dimensional array consisting of a number of magnets arranged in a plane X'-Y'. Each of the magnets is oriented perpendicular to the plane X'-Y', and adjacent ones of the magnets have opposite polarity. That is, the magnets adjacent to a magnet oriented with the North pole up are oriented with their South poles up. In the magnet array, the distance between the North and South poles is called a pole pitch, indicated by v. The magnet array 10 produces a magnetic field in the surrounding space.

The rotor 20 is disposed over the magnet array 10 and includes four coil assemblies X1, X2, Y1 and Y2 that are arranged in a matrix. In each two adjacent ones of the coil assemblies, one is arranged along a first direction (X direction) and the other is arranged along a second direction (Y direction) that is perpendicular to the first direction. Preferably, the X and Y directions form an angle of 45 degrees with the X' and Y' directions, respectively, such that the density of the magnetic flux produced by the magnet array 10 is distributed normally both in the X and Y directions. Each of the coil assemblies in the motor rotor 20 functions as a force generator. Specifically, each of the coil assemblies includes a number of three-phase coils 21 arranged in parallel. In the illustrated embodiment, each of the coil assemblies includes three three-phase coils 21. When an electric current is supplied to the three-phase coils 21, the magnetic field produced by the magnet array 10 will exert forces to the three-phase coils 21 and thereby drive the motor rotor 20 to move.

Determining an initial angle of magnetic alignment for each of the coil assemblies requires to keep the motor rotor 20 stationary and to accurately measure the forces exerted by the magnetic field on the coil assemblies in the X, Y and Z directions, with the coil assemblies being supplied with a three-phase current. To this end, the motor rotor 20 is connected to the fixed tooling 30 that is at a fixed position relative to the magnet array 10 via the force sensor 40 that is capable of measuring forces in the X, Y and Z directions. In one embodiment, as shown in FIG. 3, the fixed tooling 30 is a frame encompassing the magnet array 10. Specifically, the fixed tooling 30 together with the magnet array 10 may be disposed on a base 50. In addition, the fixed tooling 30 may be sufficient both in length and width such that the magnet array 10 and the motor rotor 20 above the magnet array are both received in a space encompassed by the fixed tooling 30, but the magnet array 10 and the motor rotor 20 are not in contact with the fixed tooling 30, in order to avoid having any impact on normal operation of the magnet array 10 and the motor rotor 20. The force sensor 40 may be implemented as a three-dimensional force sensor. That is, the force sensor 40 is individually capable of measuring all the forces in the X, Y and Z directions. In other embodiments, the measurement may also be accomplished by three one-dimensional force sensors used in combination or by a more than three-dimensional force sensor. The force sensor 40 is in connection with both the motor rotor 20 and the fixed tooling 30, thereby making the motor rotor 20 positionally fixed relative to the fixed tooling 30, and hence further relative to the magnet array 10, and being able to measure the forces of the motor rotor 20 in the three dimensions in a real time fashion.

Referring particularly to FIG. 4, the coil assembly X1 generates a horizontal force $Fx_{x1}$ and a vertical force $Fz_{x1}$, the coil assembly X2 generates a horizontal force $Fx_{x2}$ and a vertical force $Fz_{x2}$, the coil assembly Y1 generates a horizontal force $Fy_{y1}$ and a vertical force $Fz_{y1}$, and the coil assembly Y2 generates a horizontal force $Fy_{y2}$ and a vertical force $Fz_{y2}$. Preferably, in each of the coil assemblies, each two adjacent ones of the three-phase coils 21 are spaced by an interval of $4\tau/3$, where $\tau$ is the pole pitch between the North and South poles in the magnet array. As indicated above, when the magnets in the magnet array 10 are arranged in directions 45 degrees offset from the respective orientations of the coil assemblies in the motor rotor 20, the density distribution of the magnetic flux produced by the magnet array 10 is a normal distribution in both the X and Y directions. As a result, in this case, a magnetic flux density $k_j$ at the three-phase coils 21 of each force generator is given as:

$$K_j = \hat{K}\sin\left(\frac{\pi[p + 4(j-1)\tau/3]}{\tau}\right), j = 1, 2, 3 \quad (1)$$

Assuming that an actuator outputs a three-phase current described by:

$$I_j = \hat{I}\sin\left(\frac{\pi[p + 4(j-1)\tau/3]}{\tau} + \varphi\right), j = 1, 2, 3 \quad (2)$$

where, $\hat{K}$ represents the amplitude of the magnetic flux density, $\hat{I}$ is the amplitude of the three-phase current, p is the stroke of the motor rotor that is related to the motion of the motor rotor, $\varphi$ is the difference between an angle of the current following through the three-phase coils 21 in the motor rotor 20 and an angle of the magnetic flux passing through the actual location of the coils in the magnetic field, then a force F generated by each individual force generator is:

$$F = 3/2 \hat{K}\hat{I} \cos(\varphi) \quad (3)$$

As each force generator is fixedly positioned relative to magnet array 10 due to the action of the fixed tooling 30 and the force sensor 40, its magnetic flux angle is constant. In addition, for the given magnet array 10 and the given motor rotor 20, the amplitude $\hat{K}$ of the magnetic flux density and the amplitude $\hat{I}$ of the three-phase current are also constant values. In such conditions, the value of F in the above equation (3) will be in relation only to the angle of the current following through the three-phase coils 21. Therefore, the magnetic alignment system according to the present invention can determine an initial angle of magnetic alignment for a force generator, simply by varying the angle of the current flowing through the three-phase coils 21 of the force generator in the period [−τ, τ], determining the angle of the current that results in a maximum value of F with the aid of the force sensor 40, and obtaining the corresponding value of $\varphi$ as the initial angle of magnetic alignment. This will also be described in greater detail hereinafter.

Figure 5:
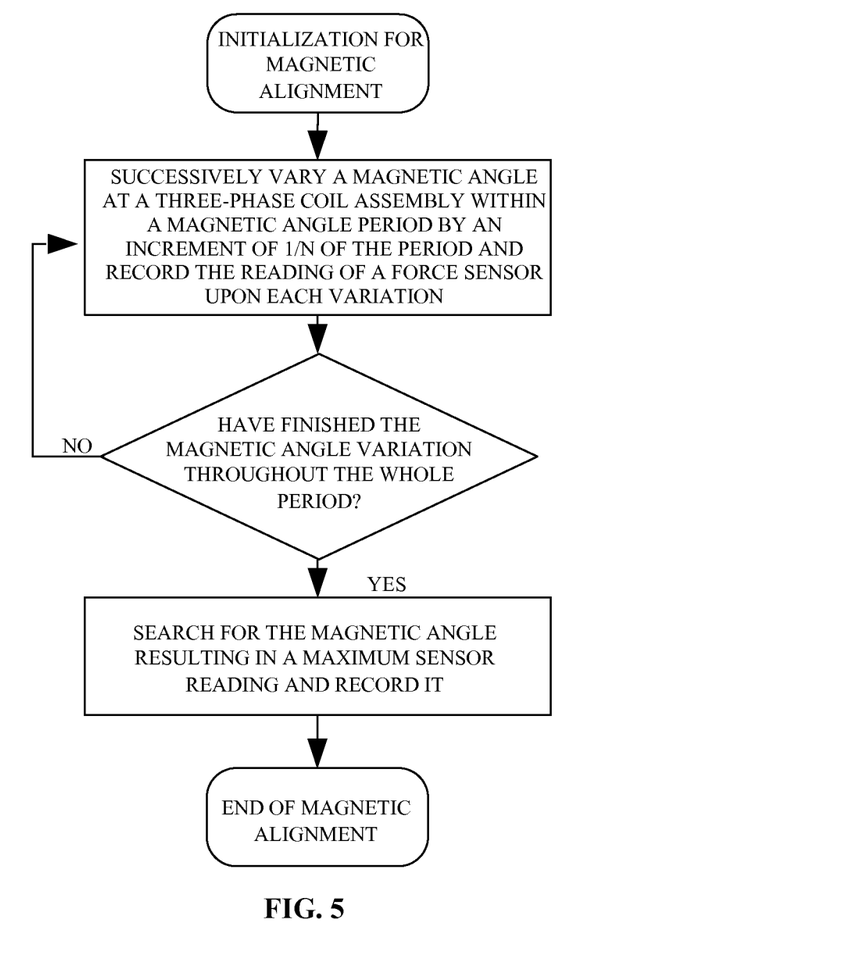
FIG. 5 is a flow chart illustrating a magnetic alignment method for a moving-coil magnetic-levitation planar motor in accordance with a specific embodiment of the present invention.

Referring to FIG. 5, in conjunction with FIGS. 2 to 4, a magnetic alignment method for a moving-coil magnetic-levitation planar motor according to the present invention, which is implemented by the above-described magnetic alignment system, includes the steps of:

selecting one of the coil assemblies;

varying an angle of the three-phase current supplied to the selected coil assembly within an adjustable angular range (equivalent to an angular period for magnetic alignment), specifically further including dividing the angular period into N equal intervals, changing the angle of the current successively by an increment of 1/N of the period, and measuring a horizontal force generated by the coil assembly using the force sensor 40 upon each angular change of the three-phase current, wherein if the selected coil assembly is coil assembly X1 or X2, the measured force is a force in the X direction; and otherwise, if the selected coil assembly is coil assembly Y1 or Y2, the measured force is a force in the Y direction;

determining an angle of magnetic alignment for the coil assembly, based on the angle of the three-phase current that causes the coil assembly to generate a maximum horizontal force; and ending the initial magnetic alignment process for the coil assembly.

In the method, the four force generators are each subjected to the forgoing initial magnetic alignment process.

It is noted that while the force sensor 40 has been described in the above embodiment as measuring the horizontal force (in the X or Y direction), the present invention is not limited in this regard as the force sensor 40 may alternatively measure a vertical force (in the Z direction). This is because both of the vertical and horizontal forces vary with φ in a normal manner, under the prerequisite that the motor rotor 20 is positionally fixed relative to the magnet array 10. Thus, in case of measuring the vertical force, the angle of magnetic alignment for the coil assembly can be simply determined as an angle corresponding to the angle of the three-phase current resulting in a maximum vertical force of the coil assembly.

Completion of the initial magnetic alignment by following the above-described steps accomplishes initial decoupling between horizontal and vertical forces for the moving-coil magnetic-levitation planar motor. The fixed tooling 30 and the force sensor 40 can then be removed to allow relative movement of the motor rotor 20 with respective to the magnet array 10, as well as closed loop servo control of the motor based on the determined initial angle of magnetic alignment. In the closed-loop configuration, further improvement in magnetic alignment accuracy is obtainable through monitoring controlled variables representative of forces generated by the motor.

Figure 6:
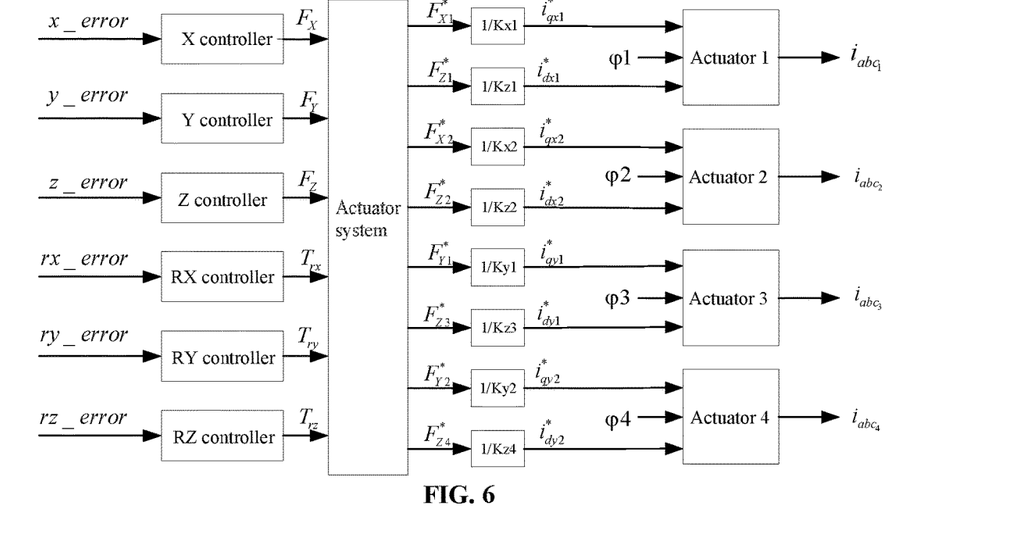
FIG. 6 is a block diagram illustrating control of a moving-coil magnetic-levitation planar motor in accordance with a specific embodiment of the present invention.

Specifically, FIG. 6 shows a block diagram illustrating a scheme of six-degree-of-freedom decoupling control of the moving-coil magnetic-levitation planar motor, which involves: four force generators, i.e., four coil assemblies X1, X2, Y1 and Y2; six controllers, i.e., an X controller, an RX controller, a Y controller, an RY controller, a Z controller and an RZ controller, corresponding to the six logical axes X, Rx, Y, Ry, Z and Rz, respectively, and configured to control outputs along the corresponding logical axes; and an actuator system for receiving from the six controllers outputs $F_X$, $F_Y$, $F_Z$, $T_{rx}$, $T_{ry}$ and $T_{rz}$ along the logical axes and transforming them into outputs $F^*_{X1}$, $F^*_{Z1}$, $F^*_{X2}$, $F^*_{Z2}$, $F_{Y1}$, $F^*_{Z3}$, $F_{Y2}$ and $F^*_{Z4}$ along eight physical axes x1, z1, x2, z2, y1, z3, y2 and z4. This may be implemented by a specific process including: reading the positional errors, including transitional errors x_error, y_error and z_error in the x, y and z directions and rotational errors rx_error, ry_error and rz_error in the rx, ry and rz directions; with x_error as an example, the X controller converting this error into an output force $F_X$ on the corresponding logical axis; the actuator system performing force redistribution to transform the logical force into physical force $F^*_{X1}$ and, based additionally on angle φ1 of magnetic alignment, causing a first actuator to output a current $i_{abc1}$; and supplying the output current $i_{abc1}$ to the coil assembly X1 to make the coil assembly X1 generate a force.

Figure 8:
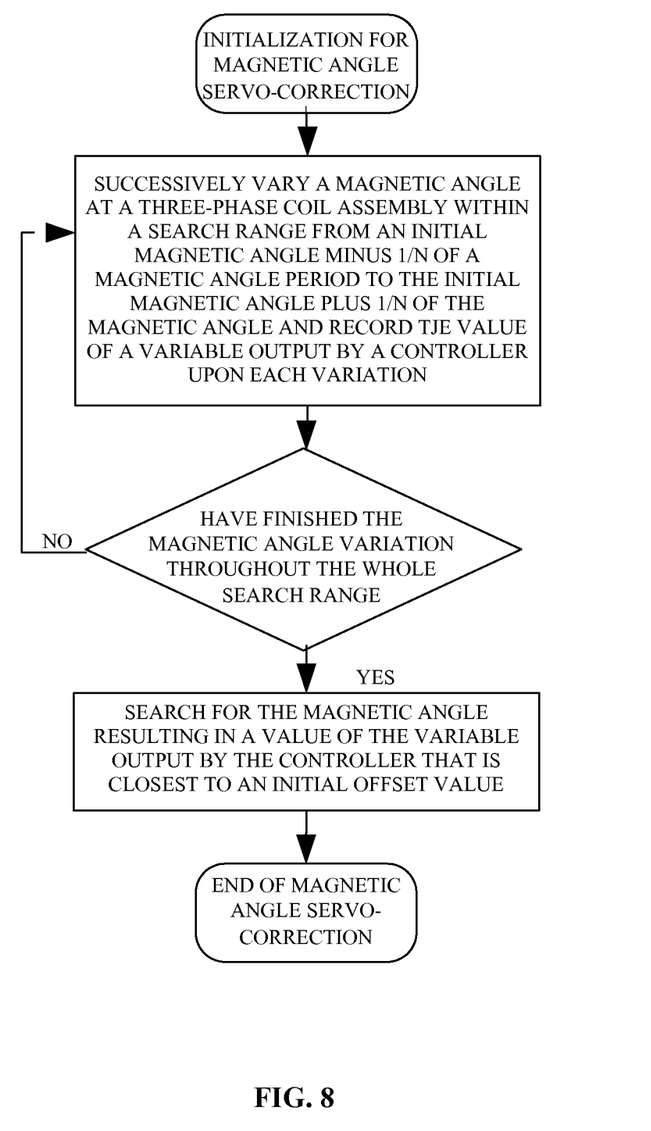
FIG. 8 is a flow chart illustrating a process for servo-correction of an angle of magnetic alignment in accordance with a specific embodiment of the present invention.

Preferably, the magnetic alignment method according to the present invention further includes a process for servo-correction of an angle of magnetic alignment, which can further improve magnetic alignment accuracy. The coil assemblies X1, X2, Y1 and Y2 of the planar motor are subjected to closed-loop control in a servo system which incorporates controllers for controlling corresponding forces generated by the planar motor in different movement directions. As shown in FIG. 8, the process includes the steps described below.

Figure 7:
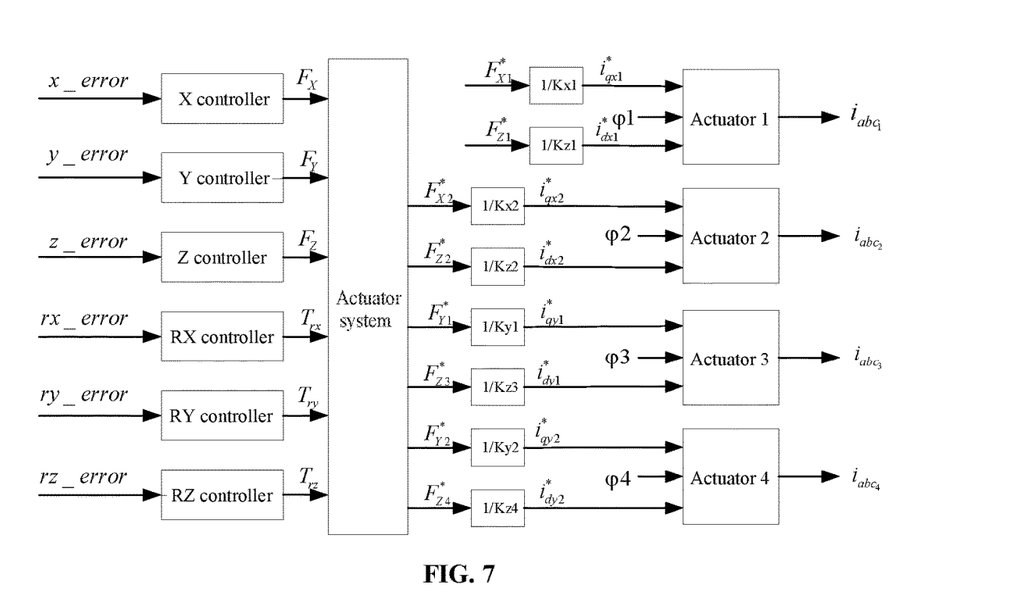
FIG. 7 is a block diagram illustrating closed-loop control formed by three coil assemblies of a moving-coil magnetic-levitation planar motor in accordance with a specific embodiment of the present invention.

One of the coil assemblies is first selected as a target coil assembly whose angle of magnetic alignment is to be servo-corrected, and the target coil assembly is then removed from the closed-loop control. The other three coil assemblies form a new closed-loop control and an output of a controller at the time is recorded as an initial offset value. In other words, when to servo-correct angle of magnetic alignment for a specific one of the coil assemblies, for example, the coil assembly X1, the specific one of the coil assemblies is not involved in servo control and the rest three of the coil assemblies, i.e., the coil assemblies X2, Y1 and Y2, form a new closed-loop control. The three force generators can still accomplish six-degree-of-freedom control of the motor. FIG. 7 is a block diagram illustrating a scheme of six-degree-of-freedom decoupling control of the moving-coil magnetic-levitation planar motor after the first actuator has been removed from the closed-loop control, which involves three force generators of the motor (i.e., the coil assemblies X2, Y1 and Y2), six logical axes (X, Rx, Y, Ry, Z and Rz) and six physical axes (x2, z2, y1, z3, y2 and z4). As such, the coil assembly X1 is ready for further correction of its angle of magnetic alignment, while the other three force generators are making the motor servo-levitated.

A three-phase current is supplied to the target coil assembly which is maintained stationary under the action of the servo system formed by the rest three coil assemblies. An angle of the three-phase current flowing through the target coil assembly is varied and an output of the controller at this time is recorded as an actual output. Preferably, during servo-correction performed on the angle of magnetic alignment for one of the coil assemblies, the angle of the three-phase current supplied to the target coil assembly is varied with in a range from the initial angle of magnetic alignment plus −1/N of an angular period for magnetic alignment to the initial angle of magnetic alignment plus 1/N of the angular period for magnetic alignment.

With the case of the first actuator being removed from the closed-loop control, as shown in FIG. 7, as an example, in the configuration of the motor being servo-levitated by the other three force generators, supplying the current to the coil assembly X1 will generate an open-loop vertical force, and in the event of a horizontal component contained therein, further adjustment of the angle of magnetic alignment is required. In other words, output Fx of the X controller is supposed to be a constant offset value $Fx_{offset}$ (while ideally $Fx_{offset}=0$, due to limited accuracy of the initial magnetic alignment process, the vertical force for levitating the motor is typically associated with a horizontal force). A vertical current $i_d$ is then provided to the force generator free from the closed-loop control, such that the motor is kept stationary under the action of the servo system. Output Fx of the X controller at this time is recorded and is compared to the initial offset value $Fx_{offset}$. If the two values are not equal, it is known that the vertical force of the force generator that is not under the closed-loop control is associated with a horizontal force. That is, its magnetic alignment accuracy can be further improved and further adjustment of its angle of magnetic alignment is thus needed. Preferably, the horizontal force component generated by coil assembly X1 being servo-corrected, and thereby a range for magnetic angle adjustment, are determined based on controlled variables read from the closed-loop control.

The angle of the three-phase current flowing through the target coil assembly is adjusted to a value resulting in the actual output that is closest to the initial offset value. Specifically, this may be accomplished by adjusting the angle φ1 of magnetic alignment of the force generator such that an observed value of Fx is closest to the initial constant offset value $Fx_{offset}$.

With the above steps completed, the process is ended.

Note that each of the force generators may be subjected to this process for improvement in their magnetic alignment accuracy.

It is apparent that those skilled in the art can make various changes and modifications to the present invention without departing from the spirit and scope thereof. It is therefore intended that the invention covers all such changes and modifications that are within the scope of the appended claims and their equivalents.

What is claimed is:

1. A magnetic alignment system, comprising:
a magnet array configured to produce a magnetic field;
a motor rotor disposed over the magnet array, wherein: the motor rotor comprises four coil assemblies arranged in a matrix, and among each two adjacent ones of the four coil assemblies, one is oriented along a first direction and the other is oriented along a second direction perpendicular to the first direction;
a fixed tooling fixed in position with respect to the magnet array; and
a force sensor unit connected between the motor rotor and the fixed tooling, such that the motor rotor is connected to the fixed tooling that is at a fixed position relative to the magnet array via the force sensor unit that is capable of measuring forces in X, Y and Z directions,
wherein the force sensor unit is configured to, in the event of one of the four coil assemblies being supplied with a three-phase current, measure a force generated by the one of the four coil assemblies under an effect of the magnetic field, and
wherein the force sensor unit comprises one force sensor that is individually capable of measuring forces in at least the X, Y and Z directions or the force sensor unit comprises three one-dimensional force sensors.

2. The magnetic alignment system of claim 1, wherein each of the four coil assemblies comprises a plurality of three-phase coils arranged in parallel.

3. The magnetic alignment system of claim 2, wherein the magnet array comprises a plurality of magnets arranged along third and fourth directions in a matrix, the third and fourth directions being perpendicular to each other, the third direction forming an angle of 45 degrees with the first direction, the fourth direction forming an angle of 45 degrees with the second direction.

4. The magnetic alignment system of claim 3, wherein in each of the four coil assemblies, each two adjacent ones of the three-phase coils are spaced by a distance of 4τ/3, where τ represents a pole pitch of two adjacent ones of the magnets in the magnet array.

5. The magnetic alignment system of claim 1, wherein the fixed tooling is not in mechanical contact either with the rotor or with the magnet array.

6. A magnetic alignment method, comprising:
providing a magnet array configured to produce a magnetic field;
providing a motor rotor disposed over the magnet array, wherein: the motor rotor comprises four coil assemblies arranged in a matrix, and among each two adjacent ones of the four coil assemblies, one is oriented along a first direction and the other is oriented along a second direction perpendicular to the first direction;

mounting a fixed tooling in a fixed position with respect to the magnet array; and connecting a force sensor unit between the motor rotor and the fixed tooling, and performing an initial magnetic alignment process on each of the four coil assemblies, the initial magnetic alignment process comprising:

varying an angle of a three-phase current supplied to one of the four coil assemblies within an angular period for magnetic alignment and measuring a horizontal or vertical force generated by the one of the four coil assemblies using the force sensor unit; and determining an angle of magnetic alignment for the one of the four coil assemblies based on the angle of the three-phase current that causes the one of the four coil assemblies to generate a maximum horizontal or vertical force.

7. The magnetic alignment method of claim 6, further comprising:

removing the fixed tooling and the force sensor unit and servo-correcting the angle of magnetic alignment on each of the four coil assemblies, comprising:

removing one of the four coil assemblies from an initial closed-loop control, causing the other three of the four coil assemblies to form a new closed-loop control under a control of a controller, and recording an output of the controller at this time as an initial offset value;

supplying a three-phase current to the one of the four coil assemblies, varying an angle of the three-phase current, and recording an output of the controller at this time as an actual output; and adjusting the angle of the three-phase current supplied to the one of the four coil assemblies to a value resulting in the actual output closest to the initial offset value.

8. The magnetic alignment method of claim 7, wherein the angle of the three-phase current is adjusted by varying the angle within a range from an initial angle of magnetic alignment plus $-1/N$ of an angular period for magnetic alignment to the initial angle of magnetic alignment plus $1/N$ of the angular period for magnetic alignment, where N is a natural number.

9. The magnetic alignment method of claim 6, wherein the fixed tooling is not in mechanical contact either with the rotor or with the magnet array.

* * * * *